United States Patent [19]

Smith

[11] E Patent Number: Re. 32,668

[45] Reissued Date of Patent: May 17, 1988

[54] FOLDABLE DISPLAY STAND

[76] Inventor: Irving Smith, c/o Arrow Art Finishers, 2020 White Plains Rd., Bronx, N.Y. 10462

[21] Appl. No.: 927,549

[22] Filed: Nov. 6, 1986

Related U.S. Patent Documents

Reissue of:

[64] Patent No.: 4,570,805
Issued: Feb. 18, 1986
Appl. No.: 663,388
Filed: Oct. 22, 1984

U.S. Applications:

[63] Continuation-in-part of Ser. No. 310,078, Oct. 9, 1981, Pat. No. 4,493,424.

[51] Int. Cl.[4] ..... A47F 5/11

[52] U.S. Cl. ..... 211/149; 211/73; 211/132; 248/174

[58] Field of Search ..... 211/149, 132, 73, 135, 211/72; 108/111, 115, 134; 312/256, 262; 206/44 R; 248/174

[56] References Cited

U.S. PATENT DOCUMENTS

| | | | |
|---|---|---|---|
| 2,294,641 | 9/1942 | Walters | 211/132 X |
| 2,344,182 | 3/1944 | Taylor . | |
| 2,677,469 | 5/1954 | Ebert | 211/73 |
| 2,713,984 | 7/1955 | Paige . | |
| 2,920,852 | 1/1960 | Hennessey . | |
| 3,300,166 | 1/1967 | Wojciechowski | 248/174 |
| 3,721,413 | 3/1973 | Robinson . | |
| 3,738,604 | 6/1973 | Howlett et al. | 248/174 X |
| 4,311,100 | 1/1982 | Gardner et al. | 211/149 X |
| 4,570,805 | 2/1986 | Smith . | |

*Primary Examiner*—Robert W. Gibson, Jr.
*Attorney, Agent, or Firm*—Kirschstein, Kirschstein, Ottinger & Israel

[57] ABSTRACT

A foldable display stand of sheet material has a back panel having at least one elongated transverse slit therein, a pair of side panels each having first and second opposing edges of which the first edge is hingedly connected to a respective one of two opposite side edges of the back panel so that each of the side panels can be positioned along substantially the same plane as the back panel, and at least one front panel having first and second opposite sides which are respectively hingedly attached to the second edges of the side panels, so that the front panel extends along a plane substantially parallel to the back panel. The display stand further includes at least one shelf hingedly connected to an edge of the front panel which extends between the first and second sides of the front panel, the shelf extending from such edge of the front panel through the associated slit in the back panel. There is further provided a biasing arrangement operative for urging the side panels into substantially parallel planes substantially normal to those of the front and back panels, the biasing arrangement including transverse walls each connected to one of the side panels substantially centrally thereof and having a slot which opens toward the shelf, and an endless elastic element having two reversing portions receiving in the slots and two element portions extending along the opposite major surface of the transverse walls between the reversing portions.

21 Claims, 4 Drawing Sheets

FOLDABLE DISPLAY STAND

Matter enclosed in heavy brackets [ ] appears in the original patent but forms no part of this reissue specification; matter printed in italics indicates the additions made by reissue.

CROSS-REFERENCE TO A RELATED APPLICATION

This application is a continuation-in-part of my earlier application Ser. No. 310,078 filed Oct. 9, 1981, now U.S. Pat. No. 4,493,424.

BACKGROUND OF THE INVENTION

The present invention relates to foldable display stands in general, and more particularly to a foldable display stand of cardboard or similar material.

There are already known various constructions of display stands, for instance, for use in supermarkets or other retail establishments for display of articles or goods on sale. Such display stands are often used as more attractive alternatives of merely stacking the articles on top of one another or displaying them in partially cut-off original cartons or boxes. However, to be acceptable to the trade, such display stands have to satisfy several criteria: they must be relatively inexpensive, easy to handle, and collapsible into a condition in which they assume a minimum amount of space individually and stacked on top of one another. Furthermore, the display stand in its erect condition should be sturdy to be able to sustain and withstand the weight of the displayed articles which can be rather substantial, versatile, i.e. not limited to the display of merely one type of article, and have at least a limited esthetic appeal so as not to interfere with the display purpose thereof. Experience has shown that rarely, if ever, do the conventional constructions of the display stands satisfy all of the above-discussed criteria.

SUMMARY OF THE INVENTION

Accordingly, it is a general object of the present invention to avoid the disadvantages of the prior art.

More particularly, it is an object of the present invention to provide an easily foldable, self-erectable display stand which satisfies all of the above-discussed criteria.

Still another object of the present invention is so to construct the display stand of the type here under consideration as to be easily foldable and erectable, sturdy in its erected condition, and assume a minimum amount of space in its folded or collapsed condition.

A concomitant object of the present invention is to devise the display stand of the above type which would be simple in construction, inexpensive to manufacture, easy to use, and reliable in operation nevertheless.

In pursuance of these objects and others which will become apparent hereafter, one feature of the present invention resides in a foldable display stand which comprises a back panel having two lateral edges and including at least one elongated slit extending across the back panel substantially normal to the lateral edges; at least one pair of side panels each hingedly connected to the back panel at one of the lateral edges and having a substantially centrally situated fold line extending substantially parallel to the respective lateral edge and subdividing the respective side panel into two portions for folding on top of one another next to the panel in a collapsed condition, and for extending substantially along a common plane substantially normal to that of the back panel in an erect condition, of the display stand; at least one front panel hingedly connected to the side panels to span the distance therebetween at respective end portions thereof remote from the back panel; at least one shelf hingedly connected to the front panel and extending therefrom into and beyond the slit to be supported in the latter in a substantially horizontal position in the erect condition, and to be juxtaposed with the back panel behind the same in the collapsed condition, of the display stand; at least one pair of connecting portions each hingedly connected to one of the side panels at the region of the fold line thereof and extending therefrom into the space between the front and back panels underneath the shelf as considered in the erect position and toward each other, each of the connecting portions having an elongated slot extending substantially normal to the shelf in the erect condition and opening onto an edge of the respective connecting portion; and an endless elastically yieldable element having reversing portions received in the slots and element portions interconnecting the reversing portions and extending along those zones of the connecting portions which are located between the respective slots for urging the connecting portions toward one another and thus the side panel portions toward the common planes of the side panels to erect the display stand with snap action.

It is especially advantageous when the edge of the respective connecting portion is that which is close to the shelf for the latter to close the open end of the slot in the erect condition.

In this connection, it is particularly advantageous when the shelf rests on an upper edge region of each of the connecting portions in the erect condition.

According to a further aspect of the present invention, it is also advantageous when the shelf is hingedly connected to a upper edge of the front panel and has a section depending from the latter for such a section and the corresponding zone of the front panel to form a barrier for confining articles supported on the shelf in the erect condition.

It is particularly advantageous when the side panels extend to an elevation higher than that of the shelf in the erect condition to provide lateral barriers for confining articles supported on the shelf in the erect condition.

According to a further facet of the present invention, the side panels have extension portions situated outside the region of the front portion, and reinforcing portions folded on top of the extension portions to reinforce the same.

It is especially advantageous when each of the connecting portions includes a first connecting section of one piece with one, and second connecting section of one piece with the other, of the side panel portions, the first and second connecting sections being separate from one another and secured to one another in juxtaposition with each other to form the respective connecting portion.

The novel features which are considered as characteristic of the invention are set forth in particular in the appended claims. The improved foldable display stand itself, however, both as to its construction and its mode of operation, together with additional features and advantages thereof, will be best understood upon perusal of the following detailed description of certain specific embodiments with reference to the accompanying drawing.

DETAILED DESCRIPTION OF THE PREFERRED EMBODIMENTS

Figure 1:
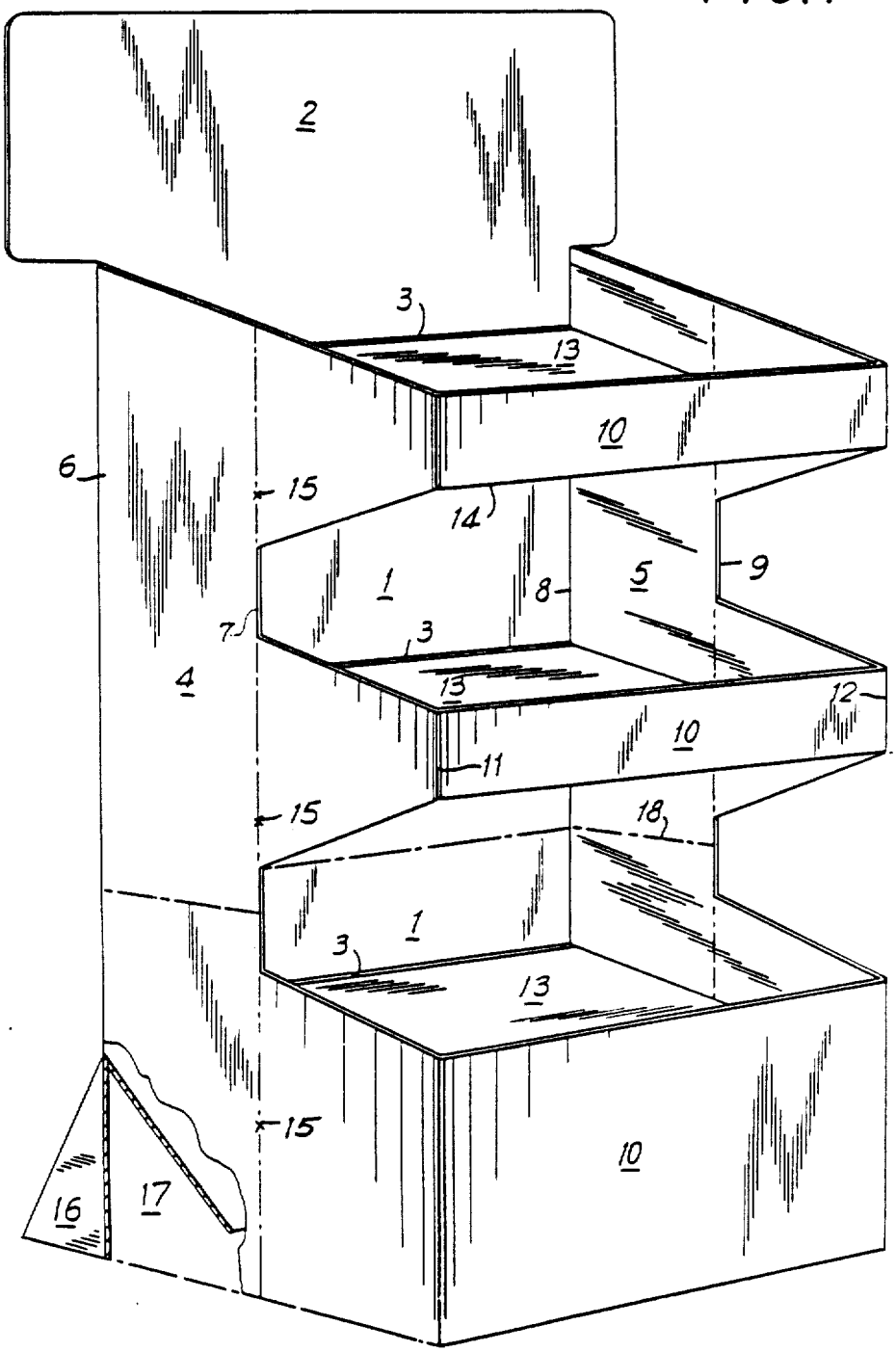
FIG. 1 is a perspective view of one construction of the display stand of the invention in its erect condition.

Referring now to the drawing in detail, and first to FIG. 1 thereof, it may be seen that the reference numeral 1 has been used therein to identify a back panel of a display stand constructed in accordance with one aspect of the present invention. The display stand of the invention can be fabricated from any suitable material, and preferably is made of cardboard. The back panel 1 has an uppermost portion 2 which can be enlarged outwardly as illustrated, if desired, in order to provide a more pronounced eye-catching area for advertising copy or the like. The back panel 1 is provided with at least one elongated slit 3 therein, but preferably with a plurality of such slits 3, as illustrated, with three. The slits 3 extend substantially parallel to one another across substantially the entire width of the back panel 1. At this juncture, it is to be mentioned that when reference is being had in this description and in the claims to particular directions or dimensions, it is to be understood that such directions or dimensions, it is to be understood that such designations are only valid with respect to the erected condition of the display stand, that is, its position of use. In other positions or conditions of the display stand, such designations would be accurate only by chance, and then not all of them at once.

A pair of side panels 4 and 5 is provided, each of them having respective first and second edges, designated as 6 and 7 for the side panel 4, and as 8 and 9 for the side panel 5. The first edge 6 of the side panel 4 is hingedly connected to one of the vertically extending edges of the back panel 1, while the first edge 8 of the side panel 5 is similarly hingedly connected to the other of the vertically extending edges of the back panel 1. The hinged connections of the side panels 4 and 5 to the back panel 1 render it possible for the side panels 4 and 5 to pivot relative to the back panel between their collapsed positions in which they extend substantially along the same plane as the back panel 1, and their erected positions in which they extend in the same direction from the back panel 1 and substantially normal thereto.

The display stand further includes one or more front panels 10 (the same number as there is of the slots 3). Each of the front panels 10 has two opposed side edges 11 and 12. A first side edge 11 of the respective front panel 10 is hingedly connected to the second edge 7 of the side panel 4, while the second side edge 12 of the front panel 10 is similarly hingedly connected to the second edge 9 of the side panel 5. The front panel 10 is situated in a plane which is substantially parallel to that of the back panel 1.

In accordance with a currently preferred feature of this particular construction, the side panels 4 and 5 are hinged at approximately the regions of their horizontal centers for pivoting about respective vertical axes so as to be able to fold each of the side panels 4 and 5 substantially in half. Then, that of the halves of the respective side panel 4 or 5 which is connected to the front panel advantageously has a substantially trapezoidal shape, the larger of the parallel lines being situated at the hinge line between the two side panel halves. This provides an attractive shape.

The display stand of the present invention can have any desired number of shelves 13, this number corresponding to that of the front panels 10 and of the slits 3. Each shelf 13 is hingedly connected to an edge 14 of the front panel 10, which edge 14 extends between and connects the side edges 11 and 12 of the front panel 10. The respective shelf then extends from the respective hinged portion thereof situated at the region of the edge 14 to and through the elongated slit 3 provided in the back panel 1. Thus, each shelf 13 is supported at its front region by being attached to the respective front panel 10, and on its rear region by the surfaces bounding the respective slit 3. On the other hand, the side edges of the respective shelf 13 are not supported on any support structure; rather, they lean against the side panels 4 and 5 and this provides a measure of support at such regions. To maintain the side panels 4 and 5 in pressing engagement with the respective shelves 13, suitable biasing means are provided. Such biasing means can take the form of an elongated elastic element which is stapled or otherwise secured to the side panels 4 and 5. Preferably, the staples 15 which connect the elastic element to the side panels 4 and 5 are located on the side panels 4 and 5 at the midpoint hinge line.

For added stability, a triangular section 16, one side of which is hingedly connected to the lower end of the respective side panel 4 or 5, can be utilized.

To collapse the display stand of the present invention, the edge 7 of the side panel 4 and the edge 9 of the side panel 5 are swung outwardly, overcoming the force of the biasing means, until the side panels 4 and 5 are situated substantially in the same plane as the back panel 1. This action causes the front panel 10 to move toward and against the back panel 1. As the front panel 10 moves toward the back panel 1, the respective shelf 13 slides through the respective associated slot 3. Since the shelf 13 is hingedly connected to the front panel 10, it can be swung against the back side of the back panel 1. In the currently preferred embodiment of the display stand constructed as illustrated in FIG. 1, the trapezoidal half of each of the side panels 4 and 5 lies in the same plane as the front panel 10 in the collapsed condition of the display stand, and against the respective other section or half of the same side panel 4 or 5. The respective triangular section 16 is swung, during the angular displacement or folding of the side panels 4 and 5, against the back panel 1 which preferably has a correspondingly shaped removed portion 17 so that the section 16 can come to lie in the same plane as the back panel 1, between the back panel 1 and the respective side panel 4 or 5. As a result, the disassembled or collapsed display stand is a very compact unit and can be fitted into a very small space for transportation and/or storage.

The action of the biasing means, which tends to urge the display stand toward its erected condition, can be overcome or neutralized by clamps or other similar holding devices or, in accordance with a currently preferred facet of the present invention, by folding the top part of the collapsed display stand onto the bottom part along a horizontally extending fold line 18.

The display stand is assembled or erected merely by snapping it into its erected condition. First, the top part of the collapsed display stand is unfolded from its folded position in which it is juxtaposed with the bottom part of the display stand. A slight force is then exerted on the collapsed display stand to urge the side panels 4 and 5 toward the front panel 10 with simultaneous unfolding of the side panels 4 and 5. Only slight unfolding of the side panels 4 and 5 need be accomplished by the outside forces, since then the biasing means will take over and cause the side panels 4 and 5 to move toward each other and to fully unfold. Since the front panel 10 is hingedly connected to the side panels 4 and 5, it will be moved away from the back panel 1 as a result of the movement of the side panels 4 and 5 caused by the biasing means, and it will pull the respective shelf 13 connected thereto through the respective associated slit 3 into its display position in which the shelf 13 is still received in the slit 3 and supported therein.

Figure 2:
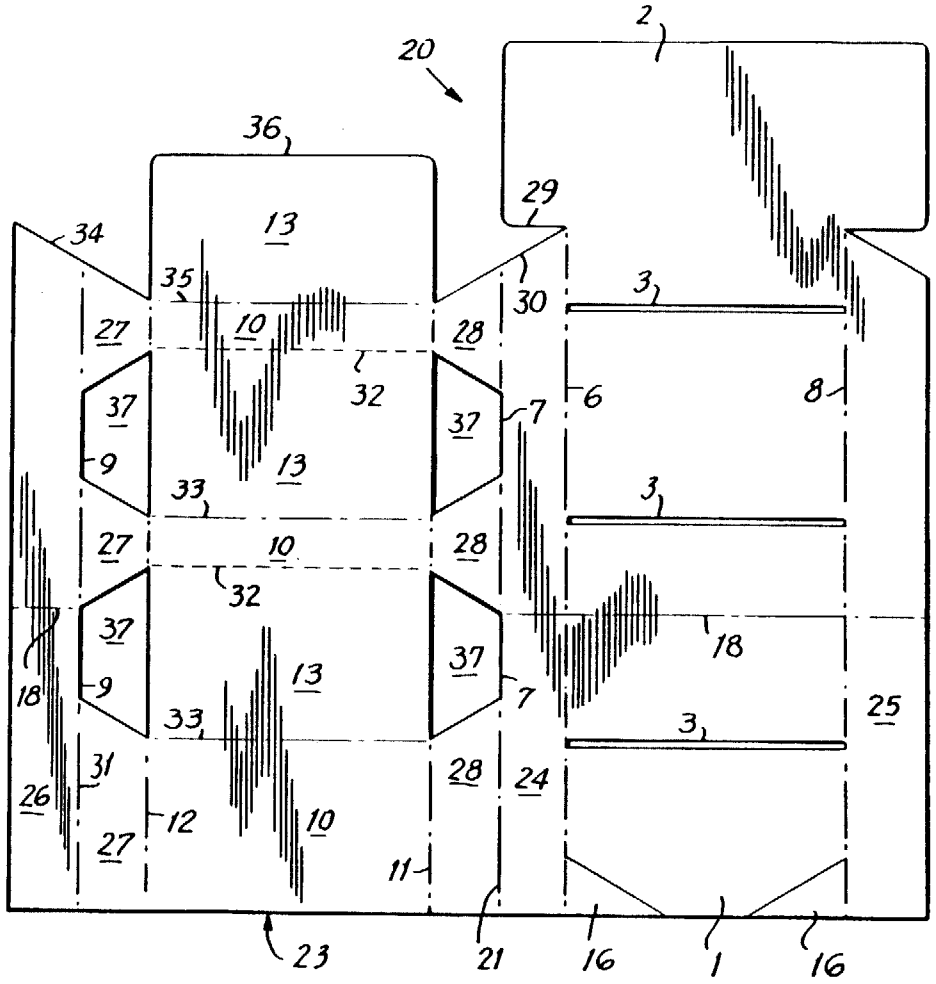
FIG. 2 is a developed view of the preform from which the construction of FIG. 1 is assembled.

One particular advantage of the display stand according to the present invention as described so far is that it can be constructed from a single sheet of carboard or similar sheet material by making appropriate folding lines and scoring lines in the single sheet. The display stand preform obtained from such a single sheet is shown in FIG 2. For ease of comparison, the same reference numerals as before will be used in FIG. 2 to designate the parts corresponding to those discussed above in connection with FIG. 1.

To produce the display stand of this construction according to the present invention, a sheet of cardboard or the like, identified by the reference numeral 20 in FIG. 2, is divided substantially in half by a vertical fold line 21 at about the mid-point so as to provide first and second sheet sections 22 and 23. To provide the advertising copy or display space 2, the first section 22 can extend vertically beyond the top of the second section 23. The first section 22 is provided with the fold lines or edges 6 and 8 which are spaced apart to define the back panel 1 of the display stand between themselves. An area 24 between the fold lines 21 and 6, on the one hand, and an area 25 between the fold line 8 and the end of the sheet, each defines one part or half of the respective side panel 4 and 5, the other half of which is constituted by respective sections 27 and 28. In the assembled condition of the display stand, an additional area 26 overlaps the area 25 and is connected thereto. If it is desired for the display space 2 to extend beyond either or both of the fold lines or edges 6 and 8, a cut or score 29 is provided from the edge of the section 22 to the respective fold lines 6 and 8. Should it be desired to have an angled or sloping side panel 4 or 5, a second score 30 is provided from the respective edge of the section 22 to the fold lines 6 and/or 8 and forms with the score 29 a notch therebetween.

The aforementioned slit or slits 3 is or are provided, each of the slits 3 extending from the fold line or edge 6 to the fold line or edge 8, one slit 3 being provided for each of the shelves 13 of the display stand. The shelves 13 can be made to lie substantially in respective horizontal planes, or in planes including desired acute angles with the horizontal, by appropriately locating the slits 3.

The second section 23 of the sheet 20 is also provided with a pair of fold lines corresponding to the side edges 11 and 12. The fold lines or side edges 11 and 12 extend vertically. The area between the fold lines 11 and 12 forms the front panels 10 and the shelves 13 of the display stand. In some instances, it may be desirable for the fold line 11 and the section-separating fold line 21 to coincide. The distance between the fold lines 11 and 21, however, is about the same in the currently preferred embodiment of this particular construction as the distance from the fold line 21 to the fold line 6. The distance from the fold line 12 to the lateral edge of the second section 22 is not critical but preferably is about the same as the distance between the fold lines 6 and 11. The portion situated between this lateral edge and the fold line 12 is provided with a vertical fold line 31 at about its midpoint.

A horizontal cut or score 32 extending from the fold line 11 to the fold line 12 is made in the second section 23. Substantially parallel thereto and spaced a vertical distance therefrom, there is established a horizontal fold line 33 which also extends between the fold lines 11 and 12. The portion of the fold lines 11 and 12 which lies between the horizontal fold line 33 and the horizontal score line 32 situated above the latter is cut or scored. As a result, each shelf 13 of the display stand is defined by the two vertical scores or cuts between the lines 32 and 33 along the lines 11 and 12, and the score line 32 and the fold line 33 which extend horizontally and interconnect the two vertical cuts or scores situated in the course of the lines 11 and 12. The front panels 10 of the display stand are then defined by the horizontal score 32 and the horizontal fold 33 situated upwardly of the latter, between those portions of the vertical fold lines 11 and 12 which have not been cut or scored.

In the preferred embodiment of this particular construction of the display stand according to the present invention, the second score 30 is continued beyond the sheet section separating fold line 21 until it reaches the vertical fold line 11. A correspondingly angled score line 34 is provided from the lateral edge of the second section 23 to the vertical fold line 12, and an interconnection fold line 35 (corresponding to the fold lines 33) is provided from the fold line 11 to the fold line 12 so as to join the scores 30 and 34. Of course, the fold line 35 could be replaced by a score line or cut 35, in which case the uppermost shelf 13 would be omitted (and the corresponding slit 3 could be omitted as well) so that the side panels 4 and 5 and the front panel 10 would merely form a holding frame at this region of the display stand for confining articles taller than the distance between the lower shelf 13 and the score line 35. However, if the uppermost shelf 13 (and the corresponding slit 3) is provided, the uppermost shelf 13 is delimited at its upper region by another score line 36.

One or more pairs of trapezoidally shaped cut-outs 37 are established, with their parallel sides lying on the score lines or portions 7, 11, 12 and 31, the larger ones of these parallel sides lying on the lines 11 and 13. Extra stability can be provided to the display stand in its erect condition by angling the fold lines 6 and 8 at an acute angle toward each other over a short distance close to the bottom of the first section 22. To be able to fold the display stand when it is being collapsed for transportation and/or storage purposes, the horizontal fold 18 is provided, extending from one lateral edge of the sheet 20 to the other lateral edge thereof, except at the areas of the trapezoidally shaped cut-outs 37 and the parts of the second sheet section 23 which form the shelves 13 of the display stand. The fold line 18 is preferably so disposed that a portion of the advertising space 2 extends beyond the end of the stand when the latter is folded substantially in half about the fold line 18.

To form the display stand of FIG. 1 from the scored and folded sheet 20 of FIG. 2, it is merely necessary to glue, staple or secure that portion 26 of the second section 23 which is situated between the lateral edge of the sheet section 23 and the fold line 12 (i.e. the portion 26 at least) to the correspondingly shaped portion 25 of the first sheet section 22, which lies between the lateral edge of the sheet section 22 and the fold line 8, and also to fit the shelf edges which are defined by the scores 32 and/or 36 through the respective slits 3. It will be appreciated that the depth of the shelves 13 which is determined by the length of the scores which connect the horizontal fold 33 and the corresponding horizontal score 32 will be greater than the width of the side panels 4 and 5 of the display stand, that is, the distance between the fold lines 11 and 6, or the distance of the fold line 12 and the outer lateral edge of the sheet section 23.

Turning now to FIGS. 3 to 6 of the drawing, it may be seen that they depict a modified construction of the display stand and of the sheet components of the same which is similar to the construction described above in so many respects that the same reference numerals but supplemented with a prime have been used to identify the corresponding parts thereof.

Figure 3:
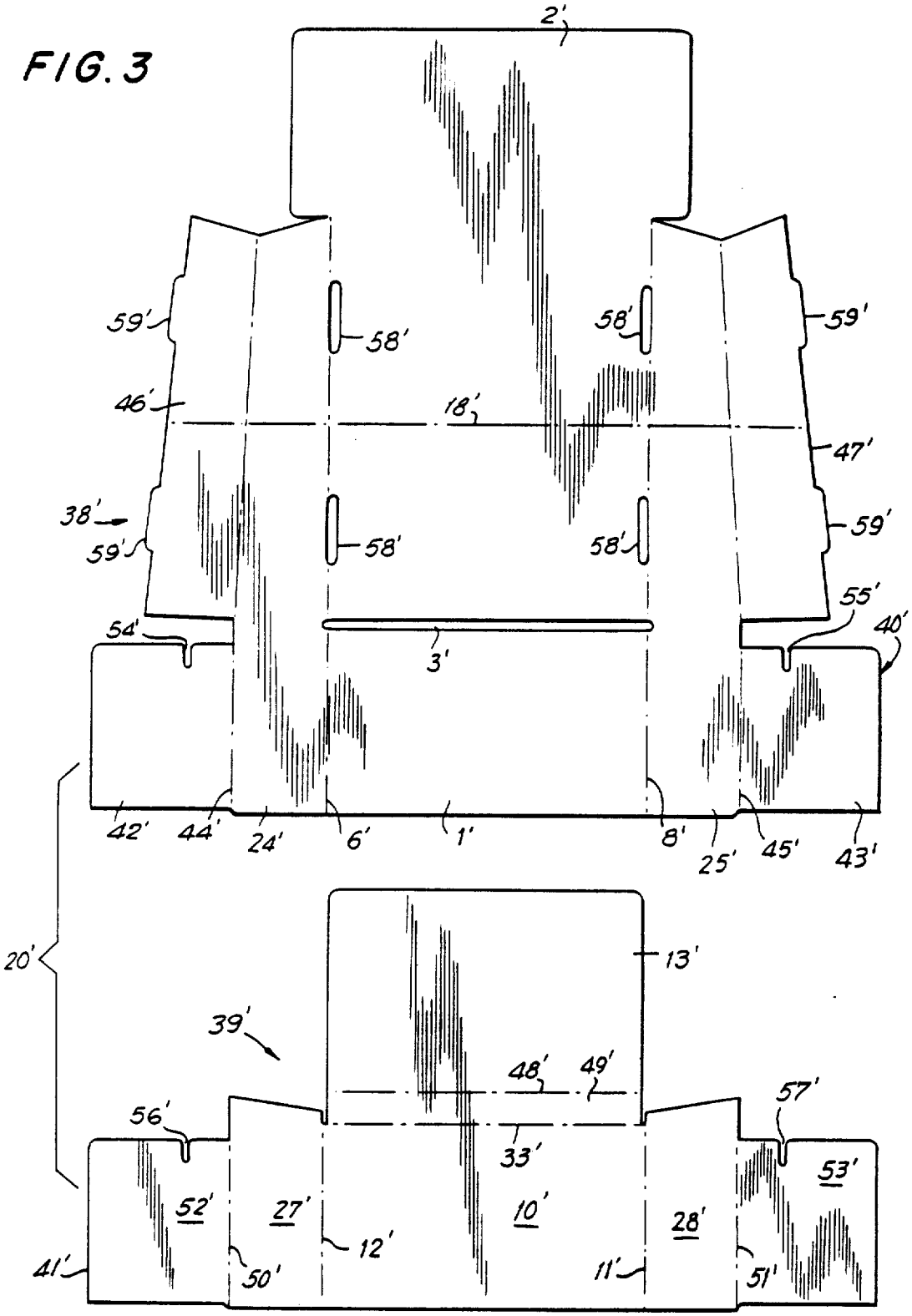
FIG. 3 is a view similar to that of FIG. 2 but for a modified construction of the display stand according to the invention.

As shown in FIG. 3, the sheet-shaped preform 20' includes two separate sections identified as 38' and 39'. While these sections 38' and 39' have been shown to be physically separated from one another, however, it will be appreciated that they could be joined at one of their lateral edges, such as at the edges identified by the reference numerals 40' and 41', to form a unitary structure. It will also be understood that, while the modified construction of the folding stand will be described below as having only a single shelf 13', it can be provided with a plurality of such shelves 13' and the supporting structures therefor by appropriately utilizing the features described below.

The section 38' is provided with the fold lines 6' and 8' which extend in the vertical direction and laterally delimit the back panel 1' which is again provided with the enlarged top portion 2' for the advertising copy. The slit 3' again extends across the back panel 1' between the fold lines 6' and 8'. Side panel portions 24' and 25' are situated at the opposite sides of the respective fold lines 6' and 8'. Connecting portions 42' and 43' adjoin the side panel portions 24' and 25', being separated therefrom by respective fold lines 44' and 45'. Furthermore, reinforcing portions 46' and 47' are provided, adjoining the respective side panel sections 24' and 25' above the connecting portions 42' and 43' and also separated therefrom by the fold lines 44' and 45'. The fold lines 44' and 45' can converge in the upward direction toward the fold lines 6' and 8' as shown, to provide an additional measure of stability to the display stand, at least at the regions of the respective reinforcing portions 46' and 47'.

The section 39' includes, in addition to the shelf 13', the front panel 10' which is laterally delimited by the fold lines 11' and 12' and is separated from the shelf by the fold line 33'. Another fold line 48' is provided on the shelf 13', extending parallel to the fold line 33' at a relatively short distance therefrom and delimiting a suspension portion 49' therewith which is juxtaposed with the front panel 10' in the erected display stand such that the shelf 13' is situated at a lower elevation at least at this region than the fold line 33', thus providing a rim for confining the articles to be displayed on the shelf 13'. The fold lines 12' and 11' respectively separate the side panel portions 27' and 28' from the front panel 10', these side panel portions 27' and 28' being delimited at their opposite sides by respective fold lines 50' and 51' which separate the same for respective additional connecting portions 52' and 53'. In the assembled condition of the display stand, the connecting portions 42' and 52', on the one hand, and the connecting portions 43' and 53', on the other hand, are substantially coextensive with one another and are secured to each other by being gluded, stapled, or otherwise connected to one another.

The connecting portions 42', 43', 52', and 53' are provided with respective incisions or open slots 54', 55', 56', and 57' which are respectively aligned with one another in pairs when the connecting portions 42', 43', 52', and 52' are juxtaposed with one another in pairs as described above. Preferably, the open slots 54', 55', 56', and 57' open in the upward direction as shown. The upper edges of the connecting portions 42', 43', 52', and 53' are situated at a slightly lower elevation than the fold line 33' and, as shown, possibly but not necessarily, than the slit 3', to provide for the suspension of the shelf 13' from the fold line 33' in the erected position of the display stand, and to support the shelf 13' from below in such erected position.

Two or more additional slits 58' are further provided, arranged in substantial coincidence with the fold lines 6' and 8', respectively. The reinforcing portions 46' and 47' are formed with integral tabs 59' which are associated with the respective additional slits 58' and are inserted thereinto in the assembled condition of the display stand to hold the reinforcing portions 46' and 47' in juxtaposition with the respective side panel portion 24' and 25' in such assembled condition, thus providing for reinforcement of such side panel portions 24' and 25' at their regions. The fold line 18' for the collapsing of the assembled display stand into its storage or transportation position is again provided substantially half-way up the section 38'.

Figure 4:
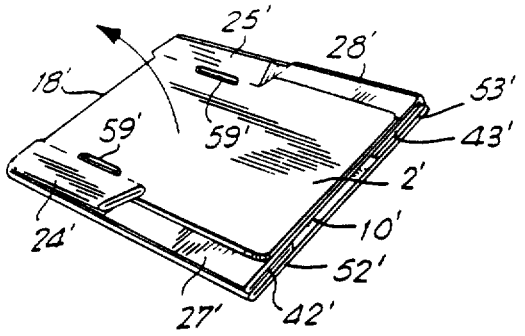
FIG. 4 is a perspective view of the construction obtained by assembly of the preform of FIG. 3, in its collapsed condition.

The assembled display stand of this modified construction is shown in its collapsed condition in FIG. 4. As may be seen, the enlarged portion 2' in this instance is juxtaposed with the front panel 10', but it will be appreciated that, as before, the fold line 18' could be situated differently (lower) than shown, so that the enlarged portion 2' would extend at least in part beyond the front panel 10' to display advertising copy provided thereon. FIG. 4 also illustrates that the side panel portions 27' and 28' (and, correspondingly, the side panel portions 24' and 25') are unfolded, that is, they extend outwardly of and substantially in the same plane as the front panel 10' (or the back panel 1'). The connecting portions 42', 52', 43', and 53' then extend inwardly into the space delimited by the front panel 10' and the rear panel 1'. As may be seen in FIG. 4, the connecting portions 42' and 52', on the one hand, and 43' and 53', on the other hand, are spaced a considerable distance from one another in the collapsed condition of the display stand.

Figure 5:
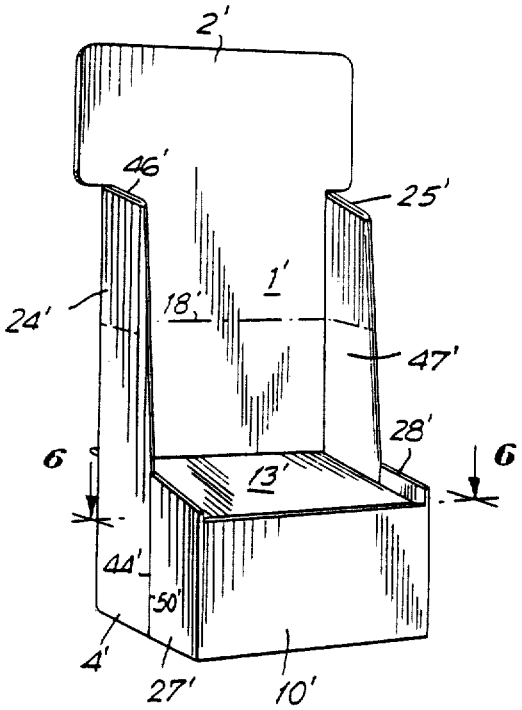
FIG. 5 is a view corresponding to that of FIG. 4 but with the display stand in its erect condition.

FIG. 5 shows the display stand in its extended or erect condition. It may be seen that the side panel portions 24' and 27' extend substantially in the same plane and thus complement each other into the side panel 4'. Similarly, even though not visible in FIG. 5, the side panel portions 25' and 28' extend in a common plane parallel to that of the side panel 4' and complement each other into the side panel 5'. It may also be seen that the reinforcing portion 47' extends in juxtaposition with, and thus reinforces, the side panel portion 25', upwardly of the shelf 13', while the reinforcing portion 46' extends similarly with respect to the side panel portions 24' and thus reinforces the latter. It may also be seen that the side panel portions 27' and 28' extend somewhat above the level of the top of the front panel 10', and thus above the (slightly lower) level of the shelf 13', thus providing for lateral confinement of the articles supported on the shelf 13'.

Figure 6:
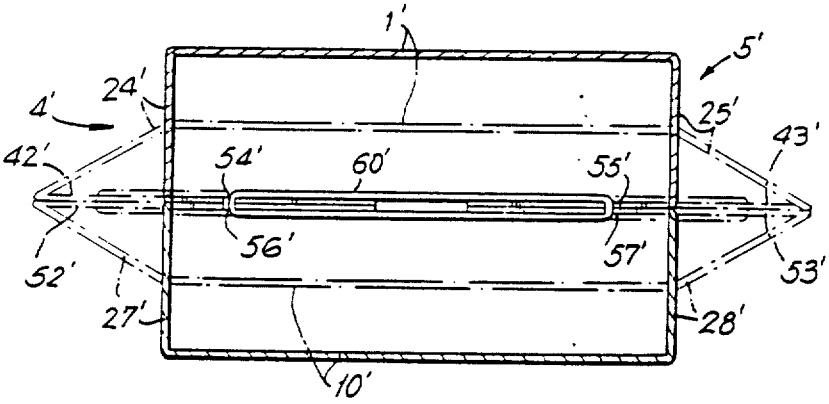
FIG. 6 is a cross-sectional view taken on line 6—6 of FIG. 5.

Finally, it may be seen in FIG. 6 that an endless element 60' is trained through the open slots 54', 55', 56', and 57'. The endless element 60' is of an elastically yieldable material and is preferably constituted by a rubber band of the requisite strength and extendability. The element 60' extends through the slots 54', 55', 56', and 57' and then along the respective connecting portions 42' and 43' on the one side, and 52' and 53' on the other side. In the position illustrated in full lines in FIG. 6 (which corresponds to the erect condition of the display stand), the endless element 60' is substantially in its relaxed condition, that is, either totally relaxed or subjected to a minimum amount of stress and suffering minimum elongation. However, FIG. 6 also shows, in phantom lines, an intermediate condition of the display stand between the erect and collapsed conditions thereof. It will be appreciated that, due to the movement of the portions 42', 43', 52', and 53' during the change from the erect condition to the intermediate condition of the display stand, and even more so during the further transition into the collapsed condition of FIG. 4, in opposite directions away from one another, the endless element 60' will be tensioned more and more and also extended more and more, so that its force will have to be overcome during the collapsing of the display stand. On the other hand, the energy stored in the extended elastically yieldable element 60' will urge the connecting portions 42', 43', 52' and 53' toward each other, thus causing displacement of the display stand into its erect condition with snap action once the display stand halves of FIG. 4 are unfolded, and the movement toward the erect condition has started over so slightly, for instance, by the user initiating such movement. It will be appreciated that, even though the slots 54', 55', 56', and 57' are open, the elastic endless element or band 60' will be safely retained therein nevertheless, since the shelf 13' will be juxtaposed with the open ends and hence close the same.

It will be understood that each of the elements described above, or two or more together, may also find a useful application in other types of arrangements differing from the type described above.

While the invention has been illustrated and described as embodied in foldable display stand, it is not intended to be limited to the details shown, since various modifications and structural changes may be made without departing in any way from the spirit of the present invention.

For example, in a preferred embodiment, the erected display stand is about six feet high, about one and one-half feet deep, and about two feet wide. This stand can support weights on the order of one hundred fifty pounds. The preferred material composition of the stand is corrugated board whose corrugations or ribs extend in the vertical direction. Of course, other dimensions and materials are also contemplated.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. A foldable display stand comprising a back panel having two lateral edges and including at least one elongated slit extending across said back panel substantially normal to said lateral edges;

at least one pair of said panels each hingedly connected to said back panel at one of said lateral edges and having a substantially centrally situated fold line extending substantially parallel to the respective lateral edge and subdividing the respective side panel into two portions for folding on top of one another next to said back panel in a collapsed condition, and for extending substantially along a common plane substantially normal to that of said back panel in an erect condition, of the display stand;

at least one front panel connected to said side panels to span the distance therebetween at respective end portions thereof remote from said back panel;

at least one shelf hingedly connected to said front panel and extending therefrom into and beyond said slit to be supported in the latter in a substantially horizontal position in said erect condition, and to be juxtaposed with said back panel behind the same in said collapsed condition, of the display stand;

at least one pair of connecting portions each hingedly connected to one of said side panels at the region of said fold line thereof and extending therefrom into the space between said front and back panel underneath said shelf as considered in said erect position and toward each other, each of said connecting portions having an elongated slot extending substantially normal to said shelf in said erect condition and opening onto an edge of the respective connecting portion; and an endless elastically yieldable element having reversing portions received in said slots and element portions interconnecting said reversing portions and extending along those zones of said connecting portions which are located between the respective slots for urging said connecting portions toward one another and thus said side panel portions toward said common planes of said side panels to erect the display stand with snap action.

2. The display stand as defined in claim 1, wherein said edge of the respective connecting portion is that which is close to said shelf for the latter to close the open end of said slot in said erect condition.

3. The display stand as defined in claim 1, wherein said shelf rests on an upper edge region of each of said connecting portions in said erect condition.

4. The display stand as defined in claim 1, wherein said shelf in hingedly connected to an upper edge of said front panel and has a section depending from the latter for such a section and the corresponding zone of said front panel to form a barrier for confining articles supported on said shelf in said erect condition.

5. The display stand as defined in claim 1, wherein said side panels extend to an elevation higher than that of said shelf in said erect condition to provide lateral barriers for confining articles supported on said shelf in said erect condition.

6. The display stand as defined in claim 1, wherein said side panels have extension portions situated outside the region of said front portion, and reinforcing portions folded on top of said extension portions to reinforce the same.

7. The display stand as defined in claim 1, wherein each of said connecting portions includes a first connecting section of one piece with one, and a second connecting section of one piece with the other, of said side panel portions, said first and second connecting sections being separate from one another and secured to one another in juxtaposition with each other to form the respective connecting portion.

8. A display stand erectable from a collapsed condition to an erect condition, comprising:

a back panel;

at least one pair of said panels each hingedly connected to said back panel;

at least one front panel connected to said side panels to span the distance therebetween at respective end portions thereof remote from said back panel;

at least one shelf hingedly connected to said front panel and extending in a substantially horizontal position in said erect condition, and juxtaposed with said back panel in said collapsed condition of the display stand;

at least one pair of connecting portions each hingedly connected to one of said side panels and extending into the space between said front and back panels underneath said shelf as considered in said erect condition and toward each other, each of said connecting portions having an elongated slot extending substantially normal to said shelf in said erect condition and opening onto an edge of the respective connecting portion, said shelf resting on an upper edge region of each of said connecting portions in said erect condition; and an endless elastically yieldable element having reversing portions received in said slots and element portions interconnecting said reversing portions and extending along those zones of said connecting portions which are located between the respective slots for urging said connecting portions toward one another, thus erecting the display stand with a snap-type action.

*9. A foldable display stand erectable, when unfolded, from a collapsed condition to an erect display condition, comprising:*

*a shelf movable from a first position in the collapsed condition, to a load-bearing second position in the erect display condition of the stand;*

*shelf support means movable from a shelf non-supporting position in the collapsed condition, to a shelf supporting position in which the shelf support means lies underneath the shelf and supports the shelf from below the shelf in the erect display condition;*

*means on the shelf support means for directly biasing the shelf support means toward the shelf supporting position when the stand is unfolded from the collapsed condition; and*

*means for translating the movement of the shelf support means toward the shelf supporting position, for automatically moving the shelf to the load-bearing second position.*

*10. The display stand as recited in claim 9, wherein the shelf and the shelf support means are panels which are juxtaposed with each other in the collapsed condition and which extend along intersecting planes in the erect condition.*

*11. The display stand as recited in claim 9; and further comprising generally planar front and rear panels juxtaposed with each other in the collapsed condition and spaced apart from each other in the erect condition; and wherein the shelf support means includes a support panel lying in, and movable along, a plane extending between, and generally parallel to, the front and rear panels.*

*12. The display stand as recited in claim 11; and further comprising generally planar side panels extending between the front and rear panels; and wherein the support panel is juxtaposed with the side panels in the collapsed condition and extends generally perpendicular to the side panels in the erect condition.*

*13. The display stand as recited in claim 12, wherein the side panels include two pairs of side panel portions at opposite sides of the stand, and wherein the shelf support means includes another support panel co-planar with said first-mentioned support panel; and wherein the biasing means is operative for moving the support panels from the shelf non-supporting position in which the support panels are further apart from each other toward the shelf-supporting position in which the support panels are spaced closer together.*

*14. The display stand as recited in claim 9; and further comprising generally planar side panels at opposite sides of the stand, and wherein the shelf support means includes a pair of support panels each hingedly connected to a respective side panel.*

*15. The display stand as recited in claim 14, wherein each side panel includes a pair of side panel portions, and wherein each support panel includes a pair of support panel portions, and wherein each pair of support panel portions is located between each pair of side panel portions in the collapsed condition.*

*16. The display stand as recited in claim 9; and further comprising a front panel hingedly connected to the shelf.*

*17. The display stand as recited in claim 16; and further comprising a rear panel juxtaposed with, and spaced apart from, the front panel in the collapsed and erect conditions, respectively; and also comprising foldable side panels extending between the front and the rear panels; and wherein the shelf support means includes a pair of support panels each connected to a respective side panel; and wherein the side panels are folded outwardly in the collapsed condition to thereby position the support panels at a predetermined distance apart from each other, and wherein the biasing means is operative to move the support panels toward each other and to correspondingly unfold and move the side panels toward each other; and wherein the movement of the side panels is translated into movement of the shelf to the second position by virtue of the movement of the side panels causing the front panel to move away from the rear panel.*

*18. The display stand as recited in claim 17, wherein the rear panel has a slit through which the shelf extends and is supported in the erect condition.*

*19. The display stand as recited in claim 9, wherein the shelf support means includes at least one support panel having an upper surface on which the shelf rests in the erect condition.*

*20. The display stand as recited in claim 19, wherein the shelf support means includes another support panel having an upper surface on which the shelf rests in the erect condition; and wherein the biasing means includes an energy storing element connected to both support panels.*

*21. The display stand as recited in claim 20, wherein both support panels have mounting means in which the element is mounted, said element being stretchable between a high-tensioned state in the collapsed condition and a low-tensioned state in the erect condition.*

* * * * *